United States Patent
Burgess et al.

(10) Patent No.: US 8,054,802 B2
(45) Date of Patent: Nov. 8, 2011

(54) HAND-OFF TRIGGER AT ACCESS TECHNOLOGY BORDERS

(75) Inventors: John K. Burgess, Morristown, NJ (US); Jialin Zou, Randolf, NJ (US)

(73) Assignee: Alcatel Lucent, Paris (FR)

( * ) Notice: Subject to any disclaimer, the term of this patent is extended or adjusted under 35 U.S.C. 154(b) by 757 days.

(21) Appl. No.: 11/976,802

(22) Filed: Oct. 29, 2007

(65) Prior Publication Data

US 2009/0111468 A1 Apr. 30, 2009

(51) Int. Cl.
*H04W 36/00* (2009.01)
(52) U.S. Cl. ......... 370/331; 370/332; 455/436; 455/437
(58) Field of Classification Search .................. None
See application file for complete search history.

(56) References Cited

U.S. PATENT DOCUMENTS

| | | | |
|---|---|---|---|
| 6,300,905 B1 * | 10/2001 | Chen et al. | 342/458 |
| 6,438,376 B1 * | 8/2002 | Elliott et al. | 455/437 |
| 6,625,132 B1 * | 9/2003 | Boettger et al. | 370/329 |
| 7,260,399 B1 * | 8/2007 | Oh et al. | 455/436 |
| 2003/0119550 A1 * | 6/2003 | Rinne et al. | 455/553 |
| 2005/0048972 A1 * | 3/2005 | Dorenbosch et al. | 455/436 |
| 2005/0048977 A1 * | 3/2005 | Dorenbosch et al. | 455/441 |
| 2005/0128980 A1 | 6/2005 | Han et al. | |
| 2007/0060126 A1 * | 3/2007 | Taniguchi et al. | 455/436 |
| 2008/0014941 A1 * | 1/2008 | Catovic et al. | 455/436 |
| 2008/0159237 A1 * | 7/2008 | Dominique et al. | 370/335 |
| 2008/0268844 A1 * | 10/2008 | Ma et al. | 455/436 |
| 2010/0091733 A1 * | 4/2010 | Hahn et al. | 370/331 |
| 2010/0190500 A1 * | 7/2010 | Choi et al. | 455/436 |

FOREIGN PATENT DOCUMENTS

| | | |
|---|---|---|
| EP | 1 555 847 | 7/2005 |
| WO | WO 00/04729 | 1/2000 |

OTHER PUBLICATIONS

"Digital Cellular Telecommunications System (Phase2+); Radio Subsystem Link COntrol (GSM 05.08 Version 7.4.1 Release 1998); ETSI EN 300 911," ETSI Standards, Lis, Sophia Antipoliis Cedex, France, vol. SMG2, No. V 7.4.1, Oct. 1, 2000, XP014002090, paragraph 8.
International Search Report and Written Opinion dated Feb. 19, 2009.

* cited by examiner

*Primary Examiner* — Robert Scheibel
(74) *Attorney, Agent, or Firm* — Harness, Dickey & Pierce, P.L.C.

(57) ABSTRACT

A method for hand-off trigger at access technology borders may include triggering a mobile station in communication with a first carrier having a first technology type to acquire synchronization with a second carrier having a second technology type if the mobile station enters a border area, the border area including at least one sector covered by at least two carriers having different Radio Access Technologies (RATs) including the first technology type and the second technology type.

22 Claims, 3 Drawing Sheets

L: Cell covered by first RAT type carrier(s)

H: Cell covered by second RAT type carrier(s)

HAND-OFF TRIGGER AT ACCESS TECHNOLOGY BORDERS

BACKGROUND

If a mobile station is in an idle state and moves across different Radio Access Technologies (RATs) coverage areas, inter-RAT idle hand-off is conducted. In order to ensure that a channel condition of a target carrier having a different RAT type than a serving carrier is sufficient, and in order to provide enough information for an access network to determine a final inter-RAT idle hand-off, idle hand-off pre-preparation is required. The idle hand-off pre-preparation may include synchronizing the mobile station with the target carrier, measuring/reporting a pilot power of the target carrier, pre-checking in to the serving carrier, and pre-registration upon exiting a border area.

Triggering the idle hand-off pre-preparation and the final idle hand-off are still open issues in the field of inter-RAT idle hand-off. In a conventional single technology system, the idle hand-off is normally triggered by a power measurement and the idle hand-off generally occurs at a sub-net boundary. If there are sharp boundaries between the subnets and a mobile station travels along a sub-net boundary area, a ping-pong issue occurs because the mobile may travel back and forth across the boundary which leads to un-necessary, frequent registrations at both sides of the sub-net. A conventional solution to the ping-pong issue is to use a hysteresis of the power measurement. However, the hysteresis of the power measurement is not reliable due to shadowing and fading in a mobile environment. The hysteresis of the power measurement is also performed at the expense of power efficiency.

Another conventional method provides a secondary color code method which uses spatial hysteresis to resolve the ping-pong issue. The secondary color code method provides a more efficient method to resolve the ping-pong issue at the sub-net boundary, but only for intra-RAT idle hand-off, and the secondary color code method introduces complexity on requesting cross sub-net paging. The secondary color code method only triggers a mobile to register and start the idle hand-off if the mobile exits the border area.

Conventional methods conduct the inter-RAT idle hand-off or the inter-RAT handoff in the connected state based on a forward link signal-to-noise ratio measurement. In many cases, a current mechanism for measuring an $E_c/I_0$ signal-to-noise ratio of a serving sector's pilot as a basis for determining when to perform a hand-off to another frequency or technology does not trigger at the right time or place if the mobile station is moving off the edge of a border sector and the forward link is not interference limited. Accordingly, the mobile station measures reasonable forward link $E_c/I_0$ signal-to-noise ratio values in locations where the reverse link is broken, because interference in the forward link may come from adjacent cells. However, for the cells at the coverage edge there is much less interference due to a smaller number of adjacent cells to the edge cells. Accordingly, even if a mobile station is far away from the base station, the forward link signal to noise ratio is still relatively good. Therefore, in this scenario both the actual signal power and the interference are lower in the forward link. As such, the mobile station is unreachable and cannot originate, even if the forward link signal to noise ratio measurement suggests that the mobile station could have been operating properly.

SUMMARY

Example embodiments relate to methods for hand-off trigger at technology borders.

According to an example embodiment, a method for hand-off trigger at access technology borders may include triggering a mobile station in communication with a first carrier having a first technology type to acquire synchronization with a second carrier having a second technology type if the mobile station enters a border area. The border area may include at least one sector covered by at least two carriers having different Radio Access Technologies (RATs) including the first technology type and the second technology type.

According to another example embodiment, a method for hand-off trigger at access technology borders may include triggering a hand-off, e.g., an idle hand-off, of a mobile station in communication with a first carrier having a first technology type to a second carrier having a second technology type if a channel condition of the second carrier is above a first threshold value, the mobile station fails to receive a second message in response to a first message sent to the first carrier in a time interval, and a number of the first message have already been sent to the first carrier; or if the channel condition of the second carrier is above a first threshold value, the mobile station receives the second message in response to the message sent to the first carrier within the time interval, and first the message indicates that a distance from the mobile station to a current base station of the first carrier is above a distance threshold. The mobile station may be synchronized with the second carrier and/or located in a border area. The border area may include at least one sector covered by at least two carriers having different Radio Access Technologies (RATs) including the first technology type and the second technology type.

According to another example embodiment, if the mobile is in a connected state, an access network of the first carrier may measure a reverse link power and/or determine a distance between the mobile station and a current serving base station of the mobile station. The access network may initiate an inter-RAT handoff based on the reverse link power measurement and/or the distance calculation.

According to still another example embodiment, a method for hand-off trigger at access technology borders may include triggering a hand-off, e.g., an idle hand-off, of a mobile station in communication with a first carrier having a first technology type to a second carrier having a second technology type if the mobile station exits a border area. The border area may include at least one sector covered by at least two carriers having different Radio Access Technologies (RATs) including the first technology type and the second technology type. The mobile station may have been synchronized with the second carrier upon entering the border area.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the scope and wherein.

DETAILED DESCRIPTION OF EXAMPLE EMBODIMENTS

In the following description, for purposes of explanation and not limitation, specific details are set forth such as particular architectures, interfaces, techniques, etc., in order to provide a thorough understanding of example embodiments. However, it will be apparent to those skilled in the art that example embodiments may be practiced in other illustrative embodiments that depart from these specific details. In some instances, detailed descriptions of well-known devices, circuits, and methods are omitted so as not to obscure the description of example embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes.

In the following description, illustrative embodiments will be described with reference to acts and symbolic representations of operations (e.g., in the form of signal flow diagrams) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As discussed herein, the term "user" may be considered synonymous to, and used interchangeably with, the term "mobile station."

Figure 1:
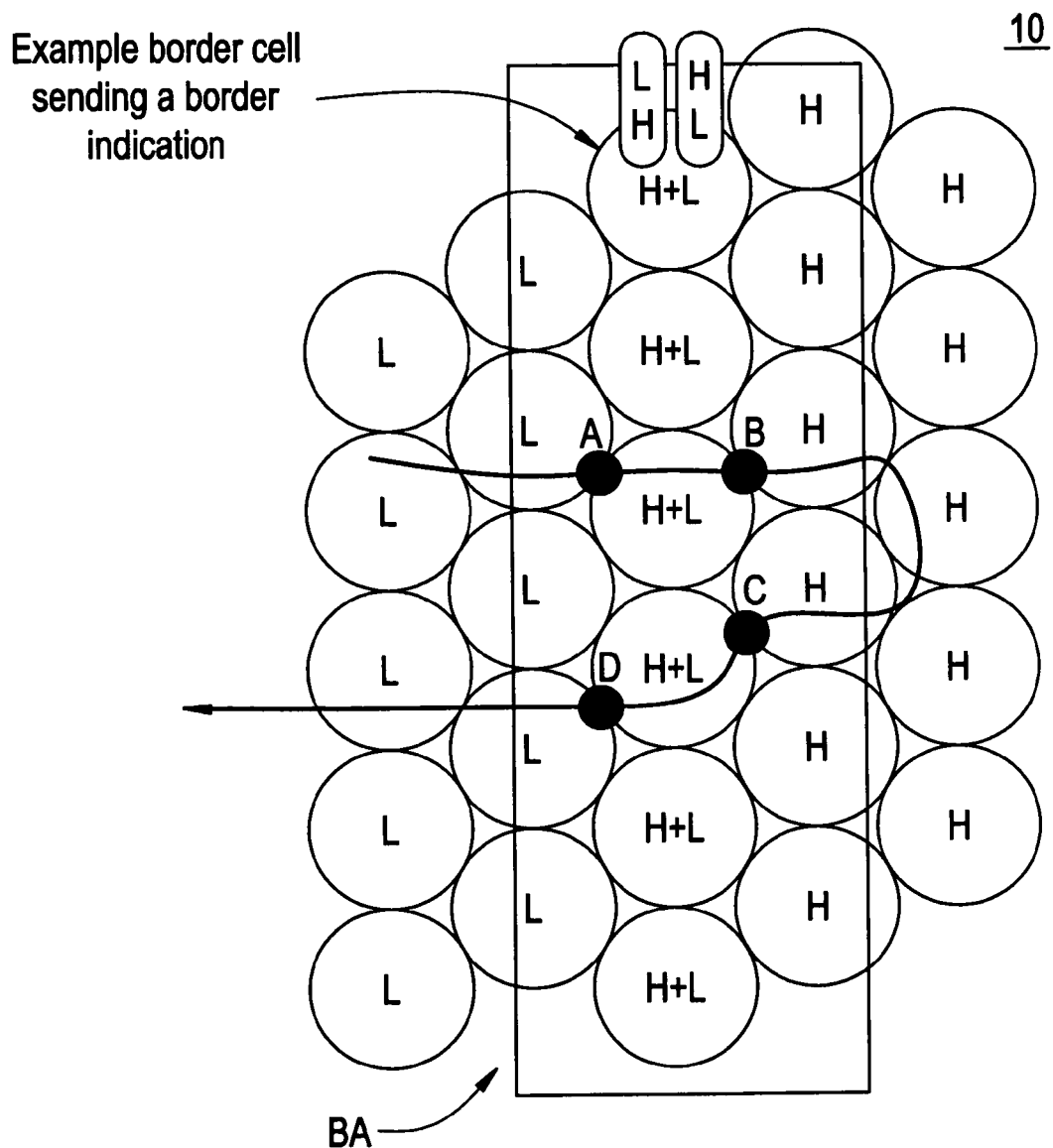
FIG. 1 illustrates a portion of a wireless cellular system in which example embodiments may be implemented.

FIG. 1 illustrates a portion of a wireless cellular system in which example embodiments may be implemented. The wireless cellular system 10 may include a plurality of cells. Each of the cells may be covered by one or more Radio Access Technologies (RATs). For example, as shown in FIG. 1 a first portion of the cells may be covered by a carrier or carriers having a first RAT type L, a second portion of the cells may be covered by a carrier or carriers having a second RAT type H, and/or a third portion of the cells may be covered by both a carrier or carriers having the first RAT type L and a carrier or carriers having the second RAT type H. The third portion of the cells may include entire cells and/or portions of cells, e.g., sectors, and/or may be referred to as a border area BA. Accordingly, the border area BA may be a cross technology border area. However, example embodiments are not limited thereto, and the third portion of the cells may be covered by more than two carriers having different RAT types.

Examples of the Radio Access Technologies (RATs) may be, CDMA 2000 3G1X, High Rate Packet Data (HRPD), Long Term Evolution (LTE), Worldwide Interoperability for Microwave Access (WiMAX), ultra mobile broadband (UMB), etc.

Although example embodiments, as described above, may include a plurality of carriers having the first RAT type L and a plurality of carriers having the second RAT type H, example embodiments described herein will be described in relation to a wireless cellular system including a first carrier having the first RAT type L, a second carrier having the second RAT type H, and a border area BA including at least one sector covered by both the first carrier and the second carrier for ease of description.

Referring to FIG. 1, the first carrier may be a serving carrier of the first RAT type for the mobile station. An example path of the mobile station including reference points A, B, C, and D is illustrated in FIG. 1. If the mobile station is at an edge of an area covered by the first carrier, the first carrier may indicate to the mobile station that a current sector is a non-interference-limited border. Accordingly, based on border information, e.g., a border indication, broadcast from the first carrier, the mobile station may be aware of entering the border area BA.

If the mobile station enters the border area BA, the mobile station may be triggered to acquire synchronization with the second carrier having the second RAT type, and/or the mobile station may perform pre-registration in response to entering the border area BA, e.g., in response to the border indication. Synchronization may sync a mobile station with a target carrier and/or allow the mobile station to monitor the target carrier message and measure the target carrier power through the target technology air interface of the target carrier. Pre-registration may negotiate a session at a target carrier through a current serving technology air interface. The mobile station may conduct a pilot measurement of the second carrier at the current sector and a pilot measurement of the first carrier at the current sector after entering the border area BA. After the mobile station has entered the border area BA, the mobile station may check-in to the first carrier based on the pilot measurement of the first carrier at the current sector.

Figure 2:
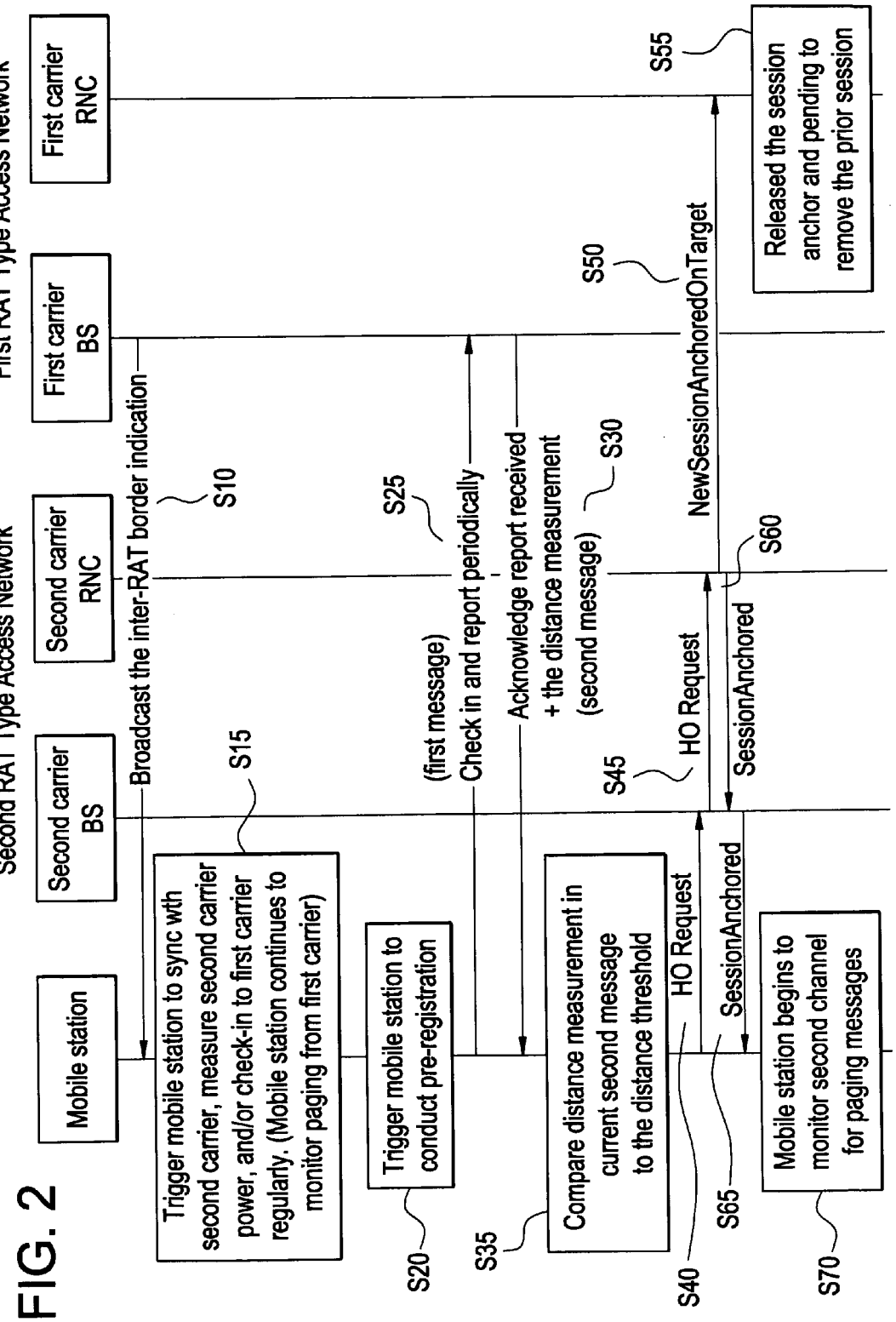
FIG. 2 is a signal flow and process diagram illustrating a method for hand-off trigger at technology borders according to an example embodiment.

Referring to FIG. 2, a procedure and signaling flow for distance based inter-RAT hand-off according to an example embodiment is described in detail below.

The mobile station may receive a border indication from a current base station of the first carrier indicating the mobile station has entered the border area BA (S10). As described above in relation to FIG. 1, the mobile station may be trigged to acquire synchronization with the second carrier (S15) and/or may perform pre-registration (S20) in response to entering the border area BA, e.g., in response to a border indication received from the first carrier.

According to an example embodiment, an access network for the first carrier may specify a maximum distance that a mobile station may be from a current serving base station. For example, the access network for the first carrier may specify a maximum distance between the mobile station and the current base station of the first carrier. The access network for the first carrier may specify a $E_c/I_0$ signal-to-noise ratio at which the mobile station may begin checking-in with the first carrier, e.g., checking a reverse link between the mobile station and the first carrier at the current sector and/or the distance the mobile station is from the current base station of the first carrier. The access network for the first carrier may specify longest and shortest time intervals for checking the reverse link and the distance. The access network may specify a number of times that the mobile station may attempt to check the reverse link and the distance before a timeout.

If the mobile station measures the $E_c/I_0$ signal-to-noise ratio of the first carrier at the current sector to be at or below a signal-to-noise ratio threshold, the mobile station may send a first message on either a Common Reverse Control Channel CRCCH or a Reverse Traffic Channel RTCH to the current base station of the first carrier to request a distance check (S25). If the current base station of the first carrier receives the first message, the current base station may measure a distance using an arrival time of the first message, e.g., an arrival time of a packet including the first message. The current base station may send a second message back to the mobile station (S30). The second message may include an indication of the distance measured by the current base station.

If the mobile station receives the second message from the current base station of the first carrier in response to the first message, the mobile station may record the distance measurement indicated by the second message and compare the distance to a distance threshold (S35). The mobile station may save a first distance measurement received from the current base station and associate the first distance measurement with a longest time interval. If a current distance is below the distance threshold, the mobile station may request another distance check, e.g., send another first message, after the longest time interval has expired.

If the mobile station does not receive a second message in response to the first message before the time interval expires, the mobile station will perform the distance check, e.g., send the first message and wait for a response in the time interval for a number of times specified by the access network for the first carrier. If the mobile station does not receive the second message in response to any of the distance check attempts and a channel condition of the second carrier at the current sector is above a first threshold value, the mobile station may declare the reverse link broken, and/or a hand-off of the mobile station, e.g., an idle hand-off of an idle mobile station, to the second carrier may be triggered. For example, the mobile station may send a hand-off request to a current base station of the second carrier (S40), and the current base station of the second carrier may forward the hand-off request to a Radio Network Controller (RNC) of the second carrier (S45).

For each distance check attempt and for each response received, the mobile station may determine the time interval until a next distance check based on a linear pro-rating for a current distance, compared to the first distance and the distance threshold to the longest time interval and a shortest time interval. Accordingly, the time interval may be made shorter as the mobile station moves closer to the edges of coverage of the first carrier.

However, if the mobile station receives the second message indicating a distance that is above the distance threshold and the channel condition for the second carrier is above the first threshold, e.g., if a pilot measurement of the second carrier at the current sector is above the first threshold, a hand-off, e.g., an idle hand-off, of the mobile station to the second carrier may be triggered. For example, the mobile station may initiate a hand-off by sending a hand-off request to the access network (S40), and the hand-off may be forwarded to the Radio Network Controller (RNC) for the second carrier (S45).

However, example embodiments are not limited thereto, and if the mobile station is in a connected state, e.g., not in the idle state, the reverse link power of the second carrier at the current sector and the distance from the mobile to the serving base station, e.g., the distance from a current base station of the first carrier to the mobile station, may be measured at the serving base station, and/or the reverse link power and the distance may be used by the access network to trigger an active mode handoff of the mobile station from the first carrier to the second carrier having the different access technology. For example, the access network may decide a hand-off based on the measured reverse link power and/or the distance calculated. The access network may send a hand-off request to the mobile station to initiate a hand-off. Accordingly, the mobile station may only need to do regular check-ins with the access network for the hand-off message. Each time the mobile station checks in, e.g., sends a message to the access network, the access network may send back an acknowledgement and specify the time for the next check-in to the mobile station.

Still referring to FIG. 2, after hand-off of the mobile station from the first carrier to the second carrier is completed, a session anchor may be switched to the second RAT type. For example, after a new session negotiation is completed, the mobile station may send a configuration complete message to the current base station for the second carrier having the second RAT type. The current base station for the second carrier may relay the message to a new session host Radio Network Controller (RNC) for the second RAT type. The new session host RNC for the second RAT type may notify an original session host RNC for the first RAT type that the new session is anchored at the RNC for the second RAT type (S50). The original session host RNC for the first RAT type may start a prior session clean up timer and send an acknowledgement to the new session host RNC (S55). After receiving the acknowledgement, the new session host RNC may send a session anchored message to the current base station of the second carrier (S60) and the current base station may send the session anchored message to the mobile station (S65). The mobile station may begin monitoring the second carrier for paging messages in response to the session anchored message (S70). However, before the mobile station receives a message that indicates the session anchor switch is completed, i.e., the session anchored message, the mobile station may monitor the first carrier for paging messages.

Figure 3:
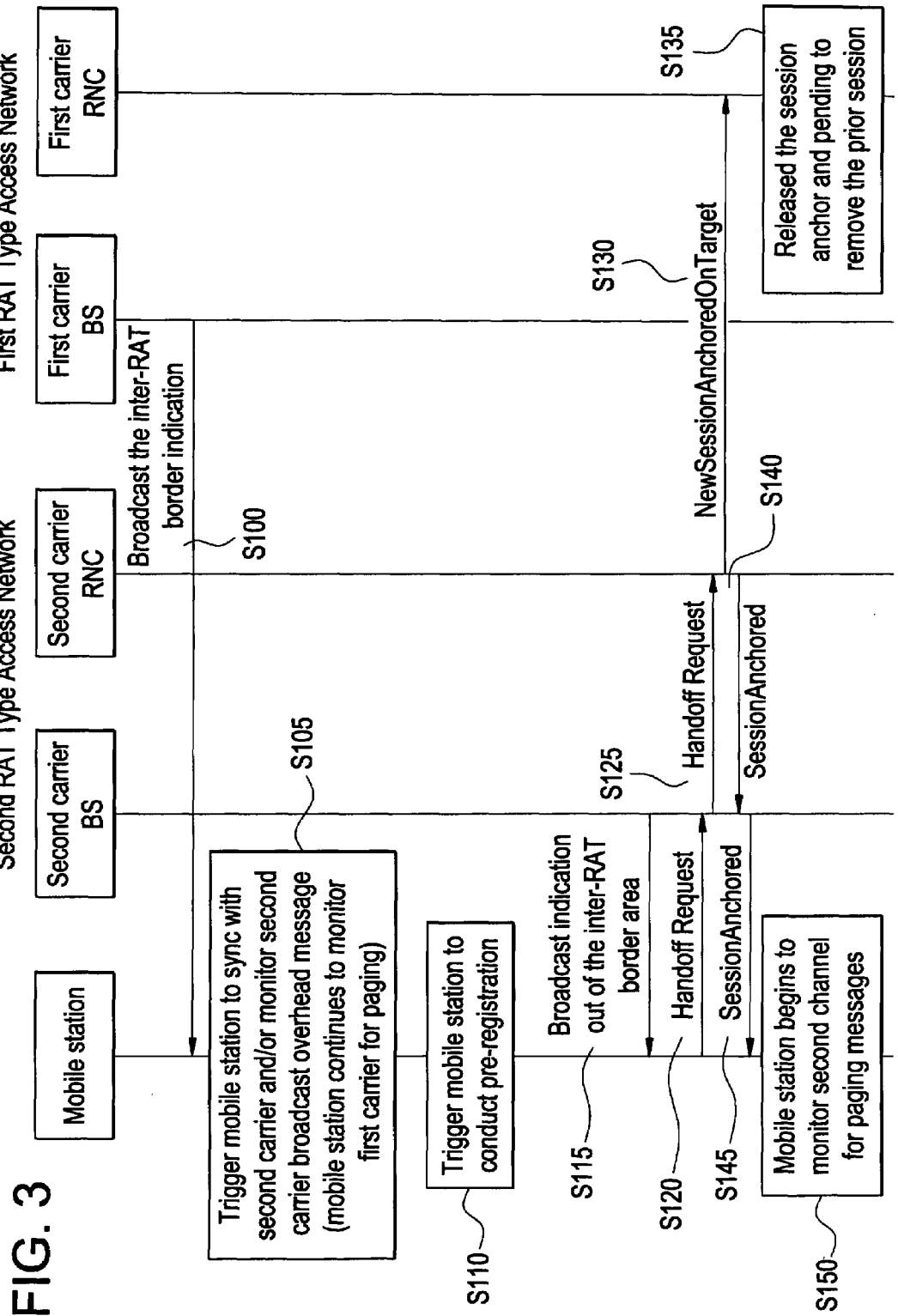
FIG. 3 is signal flow and process diagram illustrating a method for hand-off trigger at technology borders according to another example embodiment.

FIG. 3 is a signal flow diagram illustrating triggering pre-preparation and a hand-off according to another example embodiment.

Referring to FIG. 3, if an overlap of different Radio Access Technologies (RATs) is at least one cell width, for example as shown in FIG. 1, synchronization, pre-registration and/or hand-off, e.g., idle hand-off of an idle mobile station, may be triggered by a border indication, e.g., a color code/secondary color code and/or any other type of border indication.

A border indication may be broadcast by the carriers of all technologies at the border sectors. If a mobile station, e.g., an idle mobile station, receives the border indication from the first carrier, e.g., if the mobile station receives the secondary color code of the second carrier from the first carrier, the mobile station may recognize entry into the border area BA.

The mobile station may receive the border indication from the current base station of the first carrier (S100). Accordingly, entering the border area BA may trigger the mobile station to acquire synchronization with the second carrier (S105) and/or to conduct pre-registration (S110). After synchronization with the second carrier is achieved, the mobile station may begin to monitor an overhead channel of the second carrier. If the mobile station receives a broadcast overhead message on the overhead channel indicating that the mobile station is exiting the border area BA into an area not covered by the first carrier, e.g., an area only covered by the second carrier, a hand-off, e.g., an idle hand-off, of the mobile station to the second carrier may be triggered (S115). For example, the mobile station may send a hand-off request to the current base station of the second carrier (S120), and the current base station of the second carrier may forward the hand-off request to a Radio Network Controller (RNC) of the second carrier (S125).

After the hand-off to the second carrier is complete an in use session anchor may be switched to the second carrier and/or the mobile station may begin to monitor the second carrier for paging messages, e.g., steps (S130), (S135), (S140), (S145), and/or (S150) in FIG. 3, as described above in reference to FIG. 2, and therefore, a detailed explanation thereof is omitted for reasons of brevity.

For example, referring again to FIG. 1, the mobile station may conduct pre-preparation upon entry into the border area BA at reference point 1, perform a hand-off to the another carrier upon exiting the border area BA at reference point B, and/or perform similar operations upon entry to and exit from the border area BA in the opposite direction at reference points C and D.

Accordingly, example embodiments may trigger a mobile station to synchronize with a target carrier and/or to perform pre-registration upon entering a border area. According to example embodiments, the mobile station may perform a hand-off if a channel condition of a target carrier is above a first threshold value, the mobile station fails to receive a second message in response to a first message sent to the first carrier in a time interval, and/or a number of the first message have already been sent to the first carrier; or if the channel condition of the target carrier is above the first threshold value, the mobile station receives the second message in response to the first message sent to the serving carrier within the time interval, and/or the message indicates that a distance from the mobile station to a current base station of the serving carrier is above a distance threshold. According to another example embodiment, a hand-off of the mobile station may be triggered if the mobile station exits the border area.

Example embodiments being thus described, it will be obvious that the same may be varied in many ways. Such variations are not to be regarded as a departure from the example embodiments, and all such modifications are intended to be included within the scope.

We claim:

1. A method for hand-off trigger at access technology borders, comprising:
    acquiring, by a mobile station in communication with a first carrier having a first technology type, synchronization with a second carrier having a second technology type if the mobile station enters a border area, the border area including at least one sector covered by at least two carriers having different Radio Access Technologies (RATs) including the first technology type and the second technology type;
    triggering a hand-off of the mobile station to the second carrier if
        a channel condition of the second carrier is above a first threshold value, the mobile station fails to receive a second message in response to a first message sent to the first carrier in an expiring time interval, and a number of the first messages have already been sent to the first carrier; and
        triggering the hand-off of the mobile station to the second carrier if the channel condition of the second carrier is above the first threshold value, the mobile station receives the second message in response to the first message sent to the first carrier within the expiring time interval, and the message indicates that a distance from the mobile station to the current base station of the first carrier is above the distance threshold.

2. The method of claim 1, further comprising:
    triggering the mobile station in communication with the first carrier to acquire synchronization with the second carrier in response to a border indication broadcast from the first carrier, the border indication being associated with the at least two carriers having different Radio Access Technologies (RATs), and the border indication having been configured in the mobile station during an initial session configuration; and
    if the mobile station is synchronized with the second carrier, the mobile station begins to monitor a broadcast overhead message from the second carrier, measures a pilot power of the second carrier, and conducts pre-registration to negotiate a session with the radio access network of the second carrier of the different radio access technology through the first carrier.

3. The method of claim 1, wherein
    after the mobile station enters the border area, if a signal-to-noise ratio for the first carrier at a current border sector is at or lower than a signal-to-noise threshold, the mobile station sends the first message to the first carrier, and
    the mobile station repeatedly sends the first message after the expiring time interval for the second message in response to a preceding first message expires up to the number.

4. The method of claim 3, wherein if the current base station of the first carrier receives the first message, the current base station measures the distance from the mobile station to the current base station using an arrival time of the first message and sends the second message back to the mobile station indicating the distance.

5. The method of claim 4, wherein if the mobile station receives the second message, the mobile station records the distance if the distance is a first distance measurement received and associates the first distance measurement with a longest time interval.

6. The method of claim 4, wherein, for each second message received by the mobile station, the mobile station determines the expiring time interval based on a linear pro-rating for a current distance measurement compared to the first distance measurement and the distance threshold to the longest time interval and a shortest time interval.

7. The method of claim 1, further comprising:
    sending a handoff request message from the mobile station to an access network, wherein
    after the access network receives the handoff request message from the mobile station and the hand-off of the mobile station to the second carrier is complete, the access network switches a session anchor to the second carrier from the first carrier, and
    the mobile station switches from monitoring the first carrier for paging messages to monitoring the second carrier for paging messages if the mobile station receives an acknowledgment from the access network indicating the session anchor has been switched to the second carrier.

8. The method of claim 1, further comprising:
    triggering the hand-off of the mobile station to the second carrier if the mobile station exits the border area.

9. The method of claim 8, wherein the mobile station begins to monitor an overhead channel of the second carrier after synchronization with the second carrier.

10. The method of claim 9, wherein if the mobile station receives an overhead message on the overhead channel which indicates the mobile station is exiting the border area, the hand-off of the mobile station to the second carrier is triggered.

11. The method of claim 8, further comprising:
sending a handoff request message from the mobile station to an access network, wherein after the access network receives the handoff request message from the mobile station and the hand-off of the mobile station to the second carrier is complete, the access network switches a session anchor to the second carrier from the first carrier, and
the mobile station switches from monitoring the first carrier for paging messages to monitoring the second carrier for paging messages if the mobile station receives an acknowledgment from the access network indicating the session anchor has been switched to the second carrier.

12. A method for hand-off trigger at access technology borders, comprising:
monitoring, by a mobile station, paging from a first carrier after synchronization by the mobile station with a second carrier, such that the mobile station determines whether to send a handoff request;
triggering a hand-off of the mobile station in communication with the first carrier having a first technology type to the second carrier having a second technology type, the mobile station located in a border area, the border area including at least one sector covered by at least two carriers having different Radio Access Technologies (RATs) including the first technology type and the second technology type, if a link channel condition of the second carrier is above a first threshold value, the mobile station fails to receive a second message in response to a first message sent to the first carrier in an expiring time interval, and a number of the first messages have already been sent to the first carrier; and
triggering a hand-off of the mobile station to the second carrier if the link channel condition of the second carrier is above the first threshold value, the mobile station receives the second message in response to the message sent to the first carrier within the expiring time interval, and the first message indicates that a distance from the mobile station to a current base station of the first carrier is above a distance threshold.

13. The method of claim 12, wherein
after the mobile station enters the border area, if a signal-to-noise ratio for the first carrier at a current border sector is at or lower than a signal-to-noise threshold, the mobile station sends the first message to the first carrier, and
the mobile station repeatedly sends the first message after the expiring time interval for the second message in response to a preceding first message expires up to the number.

14. The method of claim 13, wherein if the current base station of the first carrier receives the first message, the current base station measures the distance using an arrival time of the first message and sends the second message back to the mobile station indicating the distance.

15. The method of claim 14, wherein if the mobile station receives the second message, the mobile station records the distance if the distance is a first distance measurement received and associates the first distance measurement with a longest time interval.

16. The method of claim 14, wherein, for each second message received by the mobile station, the mobile station determines the expiring time interval based on a linear prorating for a current distance measurement compared to the first distance measurement and the distance threshold to the longest time interval and a shortest time interval.

17. The method of claim 12, further comprising:
sending a handoff request message from the mobile station to an access network, wherein
after the access network receives the handoff request message from the mobile station and the hand-off of the mobile station to the second carrier is complete, the access network switches a session anchor to the second carrier from the first carrier, and
the mobile station switches from monitoring the first carrier for paging messages to monitoring the second carrier for paging messages if the mobile station receives an acknowledgment from the access network indicating the session anchor has been switched to the second carrier.

18. A method for hand-off trigger at access technology borders, comprising:
monitoring, by a mobile station, paging from a first carrier after synchronization by the mobile station with a second carrier, such that the mobile station determines whether to send a hand-off request;
determining, by the mobile station, if the mobile station has exited a border area into an area not being served by the first carrier based on a overhead message on a overhead channel of the second carrier, the border area including at least one sector covered by at least two carriers having different Radio Access Technologies (RATs) including a first technology type and a second technology type, the mobile station having been synchronized with the second carrier upon entering the border area; and
triggering a hand-off of the mobile station in communication with the first carrier having the first technology type to the second carrier having the second technology type if the determining step determines that the mobile station has exited the border area.

19. The method of claim 18, wherein the border area includes at least one cell covered by the at least two carriers having different Radio Access Technologies (RATs).

20. The method of claim 18, wherein the mobile station begins to monitor the overhead channel of the second carrier after synchronization with the second carrier.

21. The method of claim 20, wherein if the mobile station receives the overhead message on the overhead channel which indicates the mobile station is exiting the border area, the hand-off of the mobile station to the second carrier is triggered.

22. The method of claim 18, further comprising:
sending a handoff request message from the mobile station to an access network, wherein
after the access network receives the handoff request message from the mobile station and the hand-off of the mobile station to the second carrier is complete, the access network switches a session anchor to the second carrier from the first carrier, and
the mobile station switches from monitoring the first carrier for paging messages to monitoring the second carrier for paging messages if the mobile station receives an acknowledgment from the access network indicating the session anchor has been switched to the second carrier.

* * * * *